United States Patent [19]

Ott et al.

[11] 4,452,267

[45] Jun. 5, 1984

[54] PRESSURE REGULATING VALVE

[75] Inventors: Helmut Ott, Stuttgart; Helmut Motzer, Leinfelden-Echterdingen, both of Fed. Rep. of Germany

[73] Assignee: Herion-Werke KG, Fellbach, Fed. Rep. of Germany

[21] Appl. No.: 311,299

[22] Filed: Oct. 14, 1981

[30] Foreign Application Priority Data

Oct. 14, 1980 [DE] Fed. Rep. of Germany ....... 3038797

[51] Int. Cl.³ ............................................. G05D 16/06
[52] U.S. Cl. .................................. 137/116.5; 137/627.5
[58] Field of Search ............................ 137/116.5, 627.5

[56] References Cited

U.S. PATENT DOCUMENTS

| 2,089,144 | 8/1937 | Work | 137/116.5 |
| 2,524,264 | 10/1950 | Knox | 137/116.5 |
| 2,687,743 | 8/1954 | Huber | 137/116.5 |
| 2,783,769 | 3/1957 | Philbrick | 137/116.5 |

FOREIGN PATENT DOCUMENTS 2727491 1/1979 Fed. Rep. of Germany ... 137/116.5

Primary Examiner—Robert G. Nilson
Attorney, Agent, or Firm—Michael J. Striker

[57] ABSTRACT

A pressure regulating valve for pneumatic or hydraulic pressure fluids, by means of which a higher primary pressure is regulated to a lower secondary pressure, comprises a housing provided with a primary fluid connection, a secondary fluid connection and a fluid relief connection, a first valve for controlling flow of fluid between the primary fluid connection and the secondary fluid connection and a second valve for controlling flow of fluid between the secondary fluid connection and the fluid relief connection, in which both valves are constructed as seat valves.

7 Claims, 4 Drawing Figures

PRESSURE REGULATING VALVE

BACKGROUND OF THE INVENTION

The present invention relates to a pressure regulating valve for pneumatic or hydraulic pressure fluids comprising a valve housing having a primary fluid connection, a secondary fluid connection and a fluid relief connection, and first valve means in the housing between the primary and the secondary fluid connections and second valve means between the second fluid connection and the fluid relief connection.

A pressure regulating valve or pressure reducing valve has the task of regulating the high primary pressure to a lower secondary pressure. By increase of the secondary pressure due to external influences the surplus amount of pressure medium (for instance air or hydraulic fluid) has to be ventilated or discharged to a tank.

Pressure reducing valves are already known which are constructed as slide valves. Such valves have, however, the disadvantage that leakage will occur between the primary and the secondary fluid connection as well as between the secondary fluid connection and the fluid relief connection, which is especially disadvantageous if a plurality of such pressure reducing valves are connected in parallel to a pressure accumulator which will lead to a discharge of the latter.

SUMMARY OF THE INVENTION

It is an object of the present invention to provide a pressure regulating valve for pneumatic or hydraulic pressure fluid which avoids the above-mentioned disadvantage of such valves known in the art. It is an additional object of the present invention to provide a pressure regulating valve which will perfectly function under extended use.

With these and other objects in view, which will become apparent as the description proceeds, the pressure regulating valve for pneumatic or hydraulic pressure fluids according to the present invention mainly comprises a valve housing having a primary fluid connection, a secondary fluid connection a fluid relief connection, first valve means in the housing between the primary fluid connection and the secondary fluid connection, and second valve means between the secondary fluid connection and the fluid relief connection, wherein the valve means are constructed as seat valves.

If the pressure regulating valve is used for pneumatic pressure fluid, each of the seat valves preferably comprises a valve seat and a valve disk provided with soft sealing means movable towards and away from the respective valve seat, whereas by use of the pressure regulating valve for hydraulic pressure fluid each of the seat valves comprises a valve seat and a valve cone adapted to engage the respective valve seat.

To relieve the soft sealing means from excessive stresses it is advantageous to limit the stroke of the valve disk of the seat valve between the secondary connection and the fluid relief connection in closing direction by means of a stationary abutment provided on the housing.

Preferably, the valve disk of the seat valve between the primary and the secondary fluid connections is axially adjustable, so that the stroke and the control point of the magnet actuating the valve may be fixed.

The valve disk of the seat valve between the secondary fluid connection and the fluid relief connection is preferably provided with a damping piston in order to avoid oscillation in the valve system.

The novel features which are considered characteristic of the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
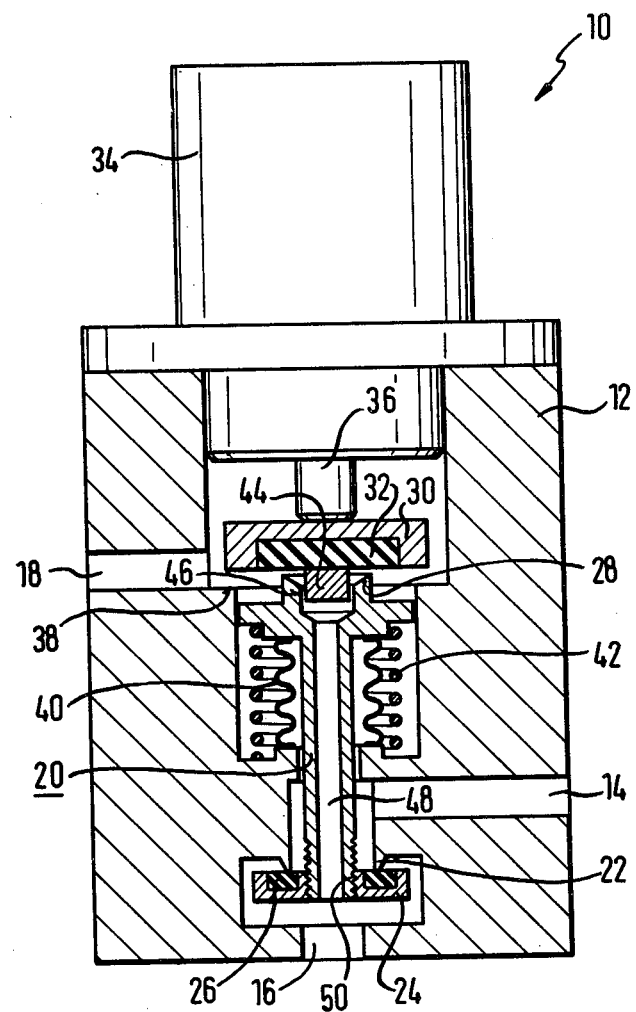
FIGS. 1-3 illustrate partially in vertical section a pressure regulating valve according to the present invention for pneumatic pressure fluid in various operating positions.
Figure 2:
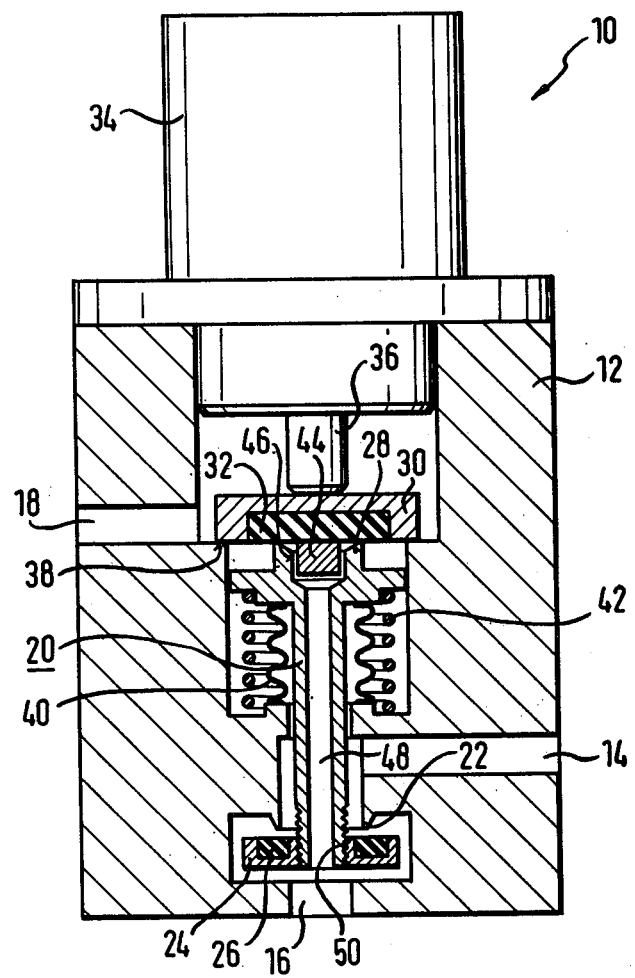
Figure 3:
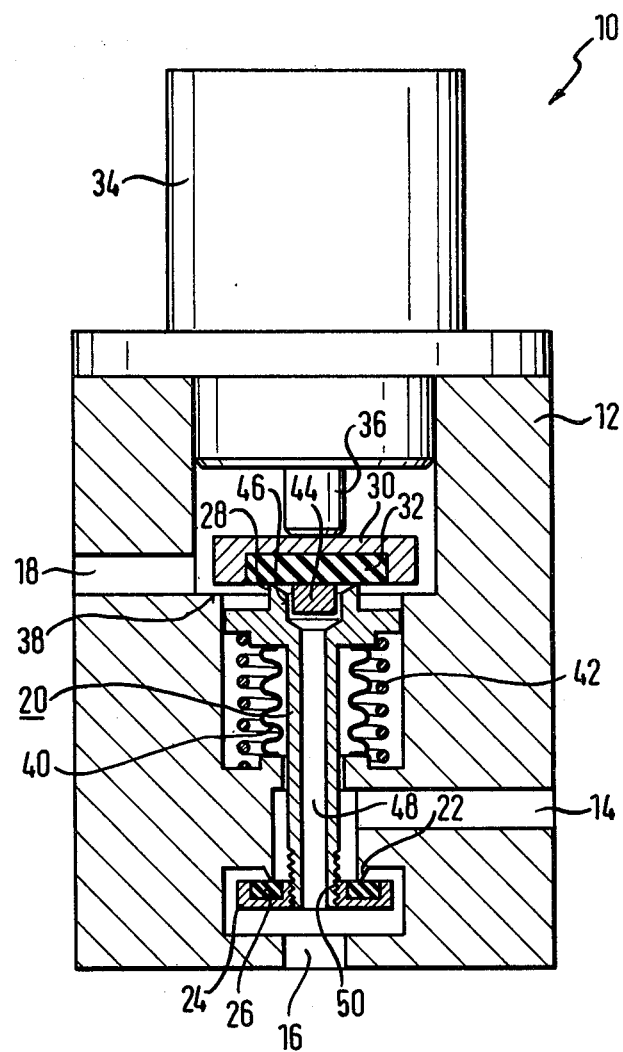

The pressure regulating valve 10 shown in FIGS. 1-3 has a housing 12 with a primary fluid connection or fluid passage 14 for a pressure medium of high primary pressure, in this case air, a secondary fluid connection or passage 16, in which the pressure depending on the adjustment of the regulating magnet 34 of the valve can be regulated to a lower pressure than the primary pressure, and a fluid relief connection or passage 18, which in the case of the valve as shown in FIGS. 1-3, that is by use of a pneumatic pressure medium, communicates at the outer end with the atmosphere.

A valve piston 22 having an extension of smaller diameter substantially coaxial with the secondary fluid connection or passage 16 and projecting toward the latter is axially movably guided in the housing 12. The piston projection is provided at its lower end, as shown in the drawing, with a valve disk 24 which together with a valve seat 22 in the housing 12 forms a first seat valve for permitting or preventing flow of pneumatic fluid from the primary fluid connection 14 to the secondary fluid connection 16. The valve disk 24 is provided with an annular soft seal 26, for instance of soft rubber, which in the closed position of the valve engages the valve seat 22. The valve disk 24 is in the illustrated embodiment screwed onto the extension of the piston 20 so as to be adjustable in axial direction relative to the latter. The thread connection is properly sealed in a manner well known in the art and not illustrated in the drawing, and means may also be provided to fix the valve disk 24 on the extension of the piston 20 in any adjusted position.

The upper end, as shown in the drawing, of the piston 20 forms a valve seat 28 which together with a valve disk 30, which is guided for movement in axial direction in the housing, in a manner not shown in the drawing, forms a second seat valve. The valve disk 30 is also provided with a soft seal 32, formed for instance of soft rubber, arranged for engaging in the closed position of the second seat valve the valve seat 28.

The valve disk 30 is engaged on the sides thereof facing away from the valve seat 28 by the armature 36 of a regulating magnet 34 mounted in any convenient manner on the upper end of the housing 12.

The extension of the piston 20 is formed with a coaxial bore 48 therethrough communicating at its lower end, as shown in the drawing, with the secondary connection or passage 16 and having at its upper end an enlarged-diameter portion 46 communicating in the open-position of the second seat valve 28, 30 with the fluid relief connection 18. The seat valve 22-24 is thus arranged between the primary connection 14 and the secondary connection 16, whereas the seat valve 28, 30 is arranged between the secondary connection 16 and the fluid relief connection 18.

An abutment 28 is provided in the housing 12 against which the valve disk 30 abuts in the position of the latter as shown in FIG. 2 as will be explained later on. The valve piston 20 is in the embodiment shown in FIGS. 1-3 connected to the housing 12 by means of a bellows 40. Biasing means in form of a coiled compression spring 42, which abuts at one end against the housing 12 and at its other end against the valve piston 20, biases the latter in a direction opposite to the force exerted by the regulating magnet 34 on the valve disk 30.

The embodiment of the regulating valve illustrated in FIGS. 1-3 operates as follows:

The primary connection 14 is connected to a pressure medium at high primary pressure. Both seat valves 22, 24 and 28, 30 are closed, that is the regulating valve is at a pressure region predetermined by the regulating magnet 34. The active surface of the seat valve 22, 24, that is the surface of the valve disk 24 within the edge of the valve seat 22, is equal to the active surface of the bellows 40, that is the surface of the piston 20 within the upper end of the bellows connected thereto, so that the valve piston 20 per se is pressure balanced. Furthermore, the diameter of the edge of the valve seat 22 at which it engages the valve disk 24 is equal to the diameter of the edge of the valve seat 28 at which it engages the valve disk 30.

An adjusted force of the regulating magnet 34 acts through the armature 36 on the upper surface of the valve disk 30. The lower surface of the valve disk 30 is acted upon by the force of the compression spring 42 as well as by a force resulting from the product of the secondary pressure times the acting surface of the seat valve 28, 30.

These forces balance each other in the position of the various elements of the valve as illustrated in FIG. 1; that is, both seat valves 22, 24 and 28, 30 are closed, and the connection between the primary connection 14 and the secondary connection 16 is interrupted as well as the connection between the secondary connection 16 and the fluid relief connection 18.

If now a higher secondary pressure is required, then the force of the regulating magnet 34 is increased in a manner well known in the art in opposition to the force exerted by the compression spring 42. Due to the increase of the force exerted by the regulating magnet 34 the system is not any longer in balance and the valve disk 30 is moved by the armature 36, as shown in FIG. 2, in downward direction until it engages the abutment 38 on the housing 12. This movement of the valve disk 30 is transmitted through the piston 20 to the valve disk 24 so that the latter is moved away from its valve seat 22 and the first valve means 22, 24 is opened so that pressure fluid at high pressure may flow from the primary connection 14 to the secondary connection 16, until in the secondary connection a secondary pressure is reached determined by the adjusted force of the regulating magnet 34. As soon as this predetermined secondary pressure is reached, the forces are then equalized and the seat valve 22, 24 closes again, so that the various elements of the regulating valve are again in the position as shown in FIG. 1. When, as mentioned above, the valve disk 30 engages the abutment 38 on the housing, the soft seal 32 of the valve disk 30 is loaded only by the force of the compression spring 42, so that the loading of the soft seal 32 is limited and excessive stresses on the soft seal are avoided.

It is also to be mentioned that in the position of the valve disk 24 shown in FIGS. 1 and 3 the soft seal 26 is only loaded by the force of the compression spring 42.

If a lower secondary pressure is desired, then the force of the regulating magnet 34 acting on the valve disk 30 is correspondingly reduced. The secondary pressure, which acts on the valve disk 30 in opposition to the force created by the regulating magnet 34, now lifts the valve disk 30 from the valve seat 28 and the seat valve 28, 30 is opened, as shown in FIG. 3, providing thereby a connection between the secondary connection 16 and the fluid relief connection 18. Pressure medium may thus flow from the secondary connection 16 to the pressure relief connection 18 until a balance of the forces is again reached, that is until the force of the spring 42 plus the force of the secondary pressure times the active surface of the valve seat 28 is equal once more to the force exerted by the regulating magnet 34.

When these forces are equalized, the regulating valve assumes again the position as shown in FIG. 1.

As shown in the drawing, the valve disk 30 is provided with a damping piston 44 projecting from the lower surface of the valve disk 30 into the enlarged bore portion 46 at the upper end of the central bore 48. The diameter of the damping piston 44 and that of the bore 46 are chosen in such a manner that the cross-section of the bore 48 is greater than the cross-section of the annular gap formed between the outer peripheral surface of the damping piston 44 and the inner surface of the enlarged bore portion 46, so that the thereby resulting differential force acting on the bottom face of the damping piston 44 acts in a direction opposite to the force exerted by the regulating magnet 34. Thereby an oscillation of the system is avoided.

Since both soft seals 26 and 32 are only acted upon by the force of the compression spring 42, and since in addition the movement of the valve disk 30 is limited by the abutment 38, excessive stress of the soft seals is avoided. Due to the axial adjustability of the valve disk 24 on the extension of the valve piston 20 it is possible to adjust and fix the stroke and the regulating point of the magnet 34. The magnet 34 is preferably a proportional magnet, the force or the stroke of which is regulatable. Due to the use of the bellows 40, it is possible to avoid the otherwise necessary seals and the friction produced by such seals.

It is further advantageous that, due to the use of seat valves, leakage is avoided.

As mentioned above, the active diameters of the valve seats 22 and 28 are equal. If, however, the valve seat 28 is constructed with a smaller diameter than the valve seat 22, then a difference between the opening pressure and the closing pressure will result, which in certain cases may be of interest.

Figure 4:
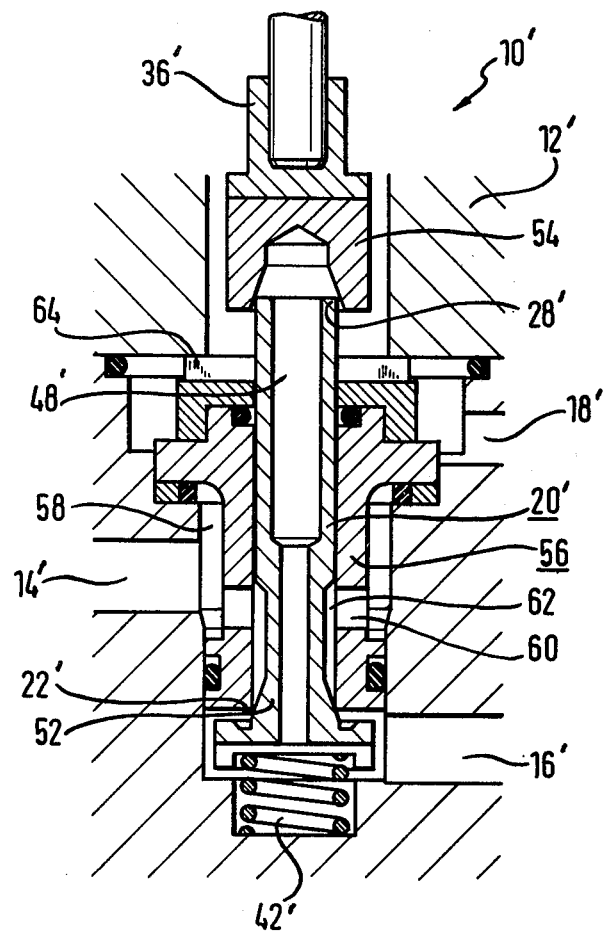
FIG. 4 is a partially sectioned view of a pressure regulating valve according to the present invention for hydraulic pressure fluid.

In the embodiment shown in FIG. 4, which is used for a hydraulic pressure medium such a pressure oil, the seat valves are constructed as conical seat valves. The pressure regulating valve 10' shown in FIG. 4 has an elongated valve piston 20' which is slidably guided in a valve bushing 56 arranged in a corresponding bore of the housing 12'. A valve cone 52 is integrally formed with the lower end of the valve piston 20, which together with the valve seat 22' at the lower end of the valve bushing 56 forms a seat valve between the primary fluid connection 14' and the secondary fluid connection 16'. The upper end of the valve piston 20' forms a valve seat 28' which cooperates with the valve cone 54 to form a seat valve between the secondary fluid connection 16' and the fluid relief connection 18'. The valve piston 20' is again formed with a coaxial bore 48' therethrough. The valve cone 54 is connected in any suitable manner to the armature 36' of a regulating magnet 34 not shown in FIG. 4. The pressure regulating valve 10' shown in FIG. 4 acts substantially in the same manner as described above in connection with the valve 10 shown in FIGS. 1-3.

In the position shown in FIG. 4 both seat valves are closed. The valve piston 20' is biased by the spring 42' in a direction in which both seat valves are closed. In the position shown in FIG. 4, the forces acting on the valve piston 20' are equalized. If the force exerted by the regulating magnet is increased, the seat valve 22', 52 is opened and the pressure medium flows from the primary connection 14' over an annular space 58 formed between the housing 12' and a portion of the bushing 56, a cross bore 60 in this bushing, and a second annular space 62 between the inner surface of the bushing and a portion of the outer surface of the valve piston 20' to the secondary connection 16'. The secondary pressure rises accordingly until the force of the regulating valve 42' and that resulting from the secondary pressure applied to the valve cone 54 is equal to the force exerted by the magnet, so that the seat valve 52, 22' closes again, thereby interrupting the flow of pressure fluid from the primary connection 14' to the secondary connection 16'.

If, however, the force exerted by the regulating magnet 34 is reduced, or the pressure at the secondary connection 16' increases due to an external force or for instance due to a temperature rise of the pressure medium, then the sum of the forces (spring force plus force due to secondary pressure) on the valve cone 54 will become greater than the oppositely directed force of the regulating magnet 34 so that the valve 28', 54 opens and pressure medium from the secondary connection 16' may flow through the bore 48', the opened valve 28', 54 and an intermediate chamber 64 to the fluid relief connection 18', until the pressure at the secondary connection 16' has dropped so far that the forces are again equalized, whereby the various members of the regulating valve 10' are again brought to the position shown in FIG. 4.

If the diameter of the valve seat 28' is smaller than that of the valve seat 22', then as already mentioned above the closing pressure between the primary connection 14' and the secondary connection 16' will be smaller than the opening pressure between the secondary connection 16' and the pressure relief connection 18'. The secondary pressure in the connection 16' will therefore vary between the two values. The same effect is provided by the regulating spring 42'.

In most cases, in order to obtain a proper regulation, the diameters of the seats 22' and 28' are held equal, and the spring 42' is constructed to exert a force to hold the valve 22', 52 just closed when pressure medium flows from the secondary connection 16' to the pressure relief connection 18'.

The pressure regulating valve described above is also suitable as a pilot valve for larger pneumatically actuated armatures or other larger pneumatically actuated valves which are to be proportionally controlled by means of the pressure regulating valve.

It will be understood that each of the elements described above, or two or more together, may also find a useful application in other types of pressure regulating valve differing from the types described above.

While the invention has been illustrated and described as embodied in a pressure regulating valve comprising first valve means between a primary fluid connection and a secondary fluid connection and second valve means between the secondary fluid connection and a fluid relief connection in which the valve means are constructed as seat valves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure regulating valve for pneumatic and hydrualic fluid comprising a valve housing having a primary fluid connection, a secondary fluid connection and a fluid relief connection; first valve means in said housing between said primary fluid connection and said secondary fluid connection; second valve means between said secondary fluid connection and said fluid relief connection, said valve means being constructed as seat valves each comprising a valve seat and a valve disk provided with soft sealing means and movable in closing direction toward and in opening direction away from the respective valve seat; and a piston slidingly guided in said housing coaxial with said secondary fluid connection and having a coaxial extension of smaller diameter than said piston and projecting from the latter toward said secondary fluid connection, said piston and said extension being formed with a bore therethrough, the valve seat of said first valve member being formed by said housing about one end of said tubular extension and the valve seat of said second valve means being provided in said piston and communicating with said bore, said valve disk of said first valve means being connected to said one end of said extension, said valve disk of said second valve means being provided with a damping piston extending with clearance into said bore.

2. A pressure regulating valve as defined in claim 1, wherein said valve seat of said first valve means has the same active diameter as that of said second valve means.

3. A pressure regulating valve as defined in claim 1, and including abutment means on said housing for limiting movement of the valve disk of said second valve means in closing direction.

4. A pressure regulating valve as defined in claim 1, wherein said valve disk is connected to said one end of said extension and is adjustable in the longitudinal direction of the latter.

5. A pressure regulating valve as defined in claim 1, and including a bellows surrounding a portion of said extension and connected at opposite ends respectively to said piston and said housing.

6. A pressure regulating valve as defined in claim 5, wherein said valve seat of said first valve means has the same active diameter as that of said second valve means, and wherein said bellows is connected to said piston at a diameter which is equal to the active diameters of said first and said second valve seats.

7. A pressure regulating valve for pneumatic and hydraulic fluid comprising a valve housing having a primary fluid connection, a secondary fluid connection and a fluid relief connection; first valve means in said housing between said primary fluid connection and said secondary fluid connection; second valve means between said secondary fluid connection and said fluid relief connection, said valve means being constructed as seat valves each comprising a valve seat and a valve disk provided with soft sealing means and movable in closing direction toward and in opening direction away from the respective valve seat; a piston slidingly guided in said housing coaxial with said secondary fluid connection and having a coaxial extension of smaller diameter than said piston and projecting from the latter toward said secondary fluid connection, said piston and said extension being formed with a bore therethrough, the valve seat of said first valve member being formed by said housing about one end of said tubular extension and the valve seat of said second valve means being provided in said piston and communicating with said bore, said valve disk of said first valve means being connected to said one end of said extension; and biasing means biasing said piston toward said valve disk of said second valve means and adjustable means biasing said valve disk of said second valve means toward its valve seat, said biasing means comprising a coil compression spring and wherein said adjustable means comprises the armature of a proportional magnet.

* * * * *